Patented Dec. 20, 1938

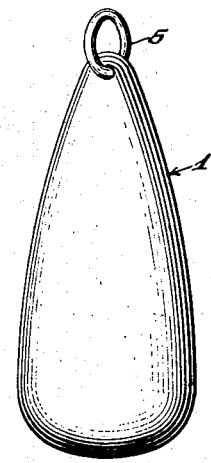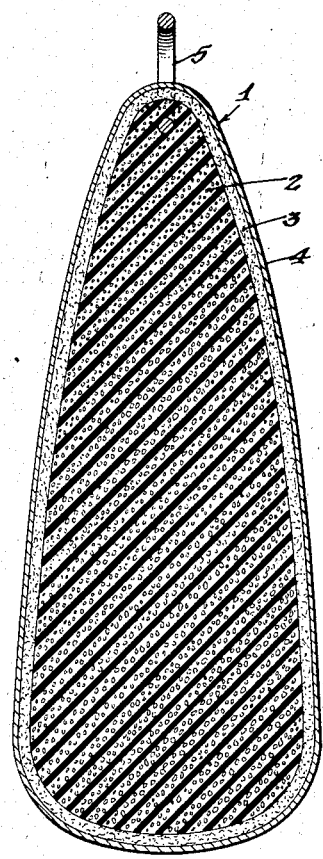

2,140,552

UNITED STATES PATENT OFFICE 2,140,552

GAS EXPANDED PRODUCT

Dudley Roberts, New York, N. Y., assignor to Rubatex Products, Inc., New York, N. Y., a corporation of Delaware Application November 30, 1934, Serial No. 755,464

3 Claims. (Cl. 9—8)

My invention relates to a novel gas expanded product and a novel process of manufacturing the same and more particularly relates to a novel expanded rubber and process for eliminating undesirable odors, flame proofing the product and increasing the sound and heat insulation properties thereof.

In application Serial No. 718,875, filed April 3, 1934, of which this application is a continuation in part, I have disclosed a novel expanded rubber and process for manufacturing the same.

Briefly, the process involves introducing into a mass of suitably prepared and treated rubber enclosed in a restricted chamber of an autoclave, nitrogen gas at several thousand pounds pressure while simultaneously applying sufficient heat to partially vulcanize the rubber. The rubber is prevented from expanding to any considerable extent during this stage, but is thoroughly impregnated with the nitrogen gas.

On completion of this stage, i. e. complete impregnation of gas, when the partial vulcanization of the rubber has occurred, the gas pressure is removed and the rubber taken from the autoclave. The rubber immediately expands to several times its original volume. It is now subjected in a press to a complete vulcanization temperature during which stage, it further expands to its final volume.

The resulting product, having many excellent properties such as lightness, low heat and sound coefficients of insulation, etc., giving it a wide and varied field of usefulness, has the defect of emitting a very disagreeable odor, apparently in large part, hydrogen sulphide, which seriously restricts its usefulness.

It is my theory that the nitrogen gas, when it is impregnated in the rubber under several thousand pounds pressure, is encased in minute gas cells which actually expand when the gassing chamber is opened and the lid on the box that contains the gassed rubber is removed. This expansion amounts to at least twice the bulk of the rubber when it is put into the gassing chamber. When, subsequently, the rubber is vulcanized, the expansion continues and the ultimate number of cubic inches in any given piece is very much greater than after the gassing stage.

It seems extremely probable that the nitrogen which originally impregnated the rubber cannot be held accountable for this increase in size, but that some other gas or gases are added to the nitrogen and make up the bulk of gas in this cellular structure. The smell is largely hydrogen sulphide, apparently produced by the hydrogen from the various organic compounds and possibly from water vapor within the rubber combining with excess sulphur, acting as the vulcanizing agent.

In accordance with my invention, I contemplate introducing a gas, i. e., ammonia ($NH_3$) with the nitrogen which will have a greater affinity for any excess sulphur present than does the hydrogen present.

Accordingly, an object of my invention is to produce a substantially odorless gas expanded rubber.

A further object of my invention is to provide a novel process in the manufacturing of expanded rubber which prevents the formation of hydrogen sulphide ($H_2S$).

Still another object of my invention is the step in the process of manufacturing expanded rubber of introducing ammonia gas at several thousand pounds pressure to suitably prepared rubber.

Still another object of my invention is the step in the process of manufacturing expanded rubber of introducing a substance having a greater affinity for sulphur than hydrogen has.

I have further discovered that either in addition to or alternative to the above process, I can further eliminate disagreeable odors and otherwise improve the product by coating the finished product with a fine metal, either by spraying thereon or by applying a foil.

Accordingly, still another object of my invention is to provide a novel expanded metal coated rubber.

There are other objects of my invention, which together with the foregoing, will appear in the detailed description which follows:

Figure 1 is a perspective of the gas expanded rubber buoy of my invention.

Figure 2 is a vertical section of the buoy of my invention.

Referring now more specifically to the drawing, the buoy 1 comprises a core of gas expanded rubber 2 surrounded by a fibrous coating 3. The fibrous coating 3 in turn is surrounded by a metal layer 4. A ring 5 is located in the buoy for attachment.

In carrying out my invention, the ingredients entering into the product are mixed in approximately the following percentages by weight:

| | Per cent |
|---|---|
| Washed first grade pale crepe or smoked rubber | 40–75 |
| Sulphur | 6–30 |
| Light calcined magnesia | 3– 5 |
| Ground gilsonite | 12 |
| Lower melting bituminous substances | 12 |

The base ingredient of the product is the rubber which is preferably of a pile crepe grade #1, obtained in sheets about $\frac{1}{32}$" to $\frac{1}{16}$" x 10" x 20".

These sheets of rubber are passed through masticating mills consisting of two rollers rotating in opposite directions as in the case of meshing gears. One roller, however, rotates slightly faster than the other, so that the rubber fed between the rolls tends to rub on the surfaces of the different rolls and a nib is formed. The extent of this nib depends on the relative speeds of the rolls and the nib in turn determines how much of the two surfaces of the rubber engage and are masticated by the respective rolls.

The rolls are steam heated to a temperature of approximately 150° F. as the rubber sheets are fed between them. The rubber is masticated or softened in this process, the individual sheets combining into a single mass of soft rubber, the degree of mastication depending on the spacing of the rolls, the temperature and the period of operation. I have found, however, that a mastication of one pound per minute at a roller temperature of 150° F. is sufficient for my purposes.

To this resulting soft rubber mass is now added an asphalt product or soft bitumen, such as suffron or mineral rubber. This asphalt is divided into fine particles and passed through a sixteen mesh sieve. While the rubber revolves on the masticating r rolls, these particles of bitumen are shovelled on and are uniformly distributed over the rubber. The heat of the rubber melts the bitumen which penetrates into and is absorbed by the rubber.

The bitumen acts as a flux at low temperatures in the stage of partial vulcanization to be explained hereinafter. Any other low temperature flux may be substituted, i. e., a low melting hydrocarbon of the asphaltic group of a bituminous or waxy nature, having fluxing properties, such as paraffin wax and stearic acid. During this stage the rubber has turned from a light to a dark color.

Ground gilsonite, divided into even finer particles than bitumen and passed through a one hundred and sixty mesh sieve, is now sprinkled or shovelled on the rubber, still passing through the masticating rolls. Gilsonite is an asphalt like bitumen, but has a much higher melting point. It will accordingly not be melted by the rubber, but will nevertheless penetrate into, impregnate and be absorbed by the soft spongy mass of rubber. Gilsonite functions as a flux in a high temperature stage to be described hereinafter, and may accordingly be replaced by any suitable high temperature flux such as a high temperature asphalt. In using the expression "flux" it will be understood that we mean a substance to soften or help amalgamate different impediments and to assist in the vulcanizing.

Summarizing the above, three stages have been described. In the first, the rolls were heated to a temperature of 150° F. while masticating or softening the rubber to combine the individual sheets into a single soft spongy mass. Assuming twenty-four pounds of rubber, twenty-four minutes may ordinarily be required for this operation.

In the second stage, a low temperature flux is applied to the rubber as it continues to pass over the rolls, in the proportions given above, and this, by reason of the heat, melts into and is absorbed by the rubber.

In the third stage, a high temperature flux is admixed with the rubber while it passes through the rolls, again in the proportions given above.

The second and third stages take fourteen minutes additional to the twenty-four minutes for mastication and result in a rubber impregnated with a high and low temperature hydrocarbon. The molecular structure of rubber is theoretically described as normally being in the form of a spiral. This may be thought as giving to the rubber its elasticity and strength. During the working of the rubber described above, a disturbance of the molecular structure apparently occurs and the rubber tends to lose its natural qualities.

I have discovered that it is essential to provide a rest period for the rubber at this stage of the operations to permit the rubber to restore itself to its original condition.

Accordingly, in the next or fourth stage, the rubber, now flat, soft and porous, is permitted to cool off and is left to rest for about twelve hours, preferably in a dark dry room at a temperature of from 80° to 100° F. The longer the rest period, the more the rubber regains its original conditions, but I have found that twelve hours will ordinarily be sufficient to restore it to about its original condition.

Following this rest period, these slabs of rubber are placed on rolls maintained at temperatures of from 120° to 130° F. As the rubber passes between the rolls, additional slabs are added, which ultimately combine into a soft mass of rubber. When the mass has been formed with adjacent engaging surfaces adhering, sulphur and light calcined magnesia, in the proportions given above, are added as the rolls rotate. Sulphur is the vulcanizer and the light calcined magnesia is the rubber toughener. Any equivalent rubber toughener, such as zinc oxide, may replace the calcined magnesia. For thorough absorption, the rolling is continued for a period of about twenty minutes.

The product is now removed from the rolls in strips or slabs of about one-half inch in thickness and two feet in length. The distorting effect of passing the rubber through the rolls is now again corrected by providing a second twenty-four hour rest period in a dark, warm, dry room at about the same temperature as the previous rest period. Again the length of the rest period may vary but at least twenty-four hours is necessary, and the longer this period, the more nearly the rubber is restored to normal.

The rubber is now placed on a warmer mill consisting of two rollers rotating at the same speed. The rubber is fed between the rolls maintained at a temperature of from 120° to 140° F. This is continued until the rubber again becomes soft and forms into a uniform plastic composite mass and during which the rubber may be formed into slabs, boards, etc. after which a further rest period of twelve hours is provided. Or, if desired, the rubber may be passed through a forcing machine which we prefer to use for mixing or for preforming the rubber in any desired shape, such as aeroplane wings, struts, pontoons, etc.

The various stages of treatment described above have resulted in agitating the rubber to such an extent that a quantity of air has been absorbed by the rubber. The presence of this air would have serious deteriorating effect during the subsequent stages to be described hereinafter. This may be described as follows:

Like glass, rubber is a plastic or super-cooled viscous liquid. Normally it would be crystalline, but it is prevented from becoming so because of the complexity of the molecules which are large and slow-moving due to the viscosity of the mixture. This super-cooled viscous liquid is physically and chemically an unstable product which tends to stabilize itself. This is particularly true if the rubber is warmed to just below melting point which favors crystallization.

Furthermore, rubber oxidizes easily because it has unsaturations or double bonds which tend to combine with oxygen readily, especially under the influence of heat and pressure, thus making the rubber brittle. In the presence of air, rubber therefore tends to oxidize. Attacked or oxidized by even a small amount of air, the rubber becomes brittle, as is well known.

To prevent this, the rubber, as is commonly known, is vulcanized, i. e., stabilized. This consists in heating the rubber with sulphur to form a vulcanized or stable product so that it no longer tends to combine with oxygen in the air. The sulphur forms a mixture of complex compounds which prevents crystallization and oxidation.

The presence, however, of even a small quantity of air will result in an oxidation, for the reasons explained above, especially before vulcanization sets in.

Accordingly, it is important to force out all the air that may have mixed with the rubber before the stage of partial vulcanization, to be described, occurs.

To this end the rubber is passed between successive calenders maintained at a temperature of from 130° to 150° F. The calender mill comprises a series of rolls decreasingly spaced from each other in successive steps. In the first step, the rolls are relatively far apart; in the next stage, closer, etc. The rubber passing through the calenders forces all the trapped air out and is reduced in size. After the rubber passes the last roll, a sheet of cloth is applied thereto to close faults appearing in the rubber and to prevent the rubber from contracting. The cloth, having a limited expansion, keeps the stretch in rubber and maintains it at a predetermined thickness.

To this product, now at a low temperature and freed from substantially all injurious air, I now introduce gas at pressures of from 150 to 200 atmospheres. The rubber is at this time in an autoclave and the gases or mixtures of gas as described hereinafter are those which have no affinity for the raw rubber. Thus, in accordance with my invention, I use a mixture of ammonia and nitrogen gas while simultaneously applying sufficient heat to effect a partial vulcanization of the rubber. About thirty minutes are necessary to permit the autoclave to reach a stable temperature and thereafter the container is maintained at the same temperature obtained from a supply of steam at about eight pounds pressure. Care is required during this period to prevent the temperature from rising to a vulcanizing temperature.

In accordance with my invention, I mix ammonia with nitrogen in the large steel bottle where the pressure is built up by the high pressure pump, which bottle is subsequently used to fill the gassing chamber. It is obvious that this must be carefully regulated because there is a critical temperature or temperatures at which the ammonia would liquefy. However, as the percentage of ammonia in its relation to nitrogen is diminished, this danger from the liquefaction of ammonia diminishes. On the other hand, sufficient ammonia must be added to materially prevent any combination of hydrogen and sulphur to form hydrogen sulphide ($H_2S$).

By this method I contemplate the formation of ammonium sulphide and avoid the formation of any substantial amount of hydrogen sulphide. In practice, the amount of ammonia gas which must be added to the nitrogen to overcome any considerable tendency toward formation of hydrogen sulphide and at the same time keep the ammonia sufficiently low in proportion to prevent liquefaction at critical temperatures and pressures at the extremely high pressure to which these gases are exposed in the process, depends on the pressures and temperatures required, which in turn may depend on the composition of the rubber. However, the addition of as low as 5% of ammonia to the nitrogen showed marked improvement.

I am fully aware of the fact that ammonia salts have been used for forming an expanding gas. My invention contemplates something entirely and fundamentally different in that I propose using the ammonia gas for two functions: (1) to expand, as in the case of pure nitrogen; and (2) for providing an element which has a greater affinity for sulphur than hydrogen so that the available sulphur tends to combine with the powerful ammonia gas present in the mixture.

Alternatively, instead of subjecting the rubber to external gas, I may mix a granular charcoal or carbon. In order to assist in the application of the charcoal I soften the rubber mixture by adding a small percent of oil, such as coal tar or pine oil. The addition of this oil might be made at the time the sulphur is added. The charcoal is prepared as follows:

A quantity of a suitable activated charcoal or carbon selected so that it will pass through a hundred mesh sieve is placed in jars which can be hermetically sealed. These jars, with their tops open, are placed in an autoclave which is thereafter heated to and maintained at a temperature of 140°–180° F. for a period of approximately one-half hour.

The autoclave is then evacuated by an air pump in any suitable manner to produce a negative pressure or a substantial vacuum.

As is well known, the charcoal has a strong affinity for surrounding matter and accordingly takes up occluded gases such as air, each molecular particle of carbon absorbing a considerable number of volumes of gas greater than its own volume. It is important that all such occluded air be withdrawn from the carbon since the carbon's affinity for other gases is greatly diminished while any gas such as air is present.

Moreover, the presence of any air in the carbon, if it is driven off subsequently while the carbon is mixed with the rubber, as will be described hereinafter, will have a deleterious effect on the raw rubber prior to the vulcanization.

Accordingly, the application of heat and the evacuation becomes absolutely essential in order to secure the release or detachment of the molecules of atmospheric air, especially the removal of oxygen which would have a deleterious effect on the rubber and prevent the subsequent adsorption or absorption of gases to be used.

This heating and evacuating process continues for approximately one-half hour and the charcoal is then ready to be subjected to any inert gas which does not have an affinity for sulphur, such as nitrogen or carbon dioxide, which is now admitted to the chamber under a slight pressure to bring about the greatest possible absorption and adsorption of the nitrogen gas. This activated carbon or charcoal is then cooled and kept in the containers or jars mentioned above, suitably hermetically sealed, in a cool place to prevent as far as possible the loss of the gas.

It will be understood by those skilled in the art that in the event the charcoal is to be used immediately, this safeguard is unnecessary.

The occluded or activated charcoal is now calendered into the rubber mixture in any preferred manner, such as that described in detail above, preferably at as low a temperature as possible, as for example 120° F., to prevent the loss of any gas. In this stage the rubber should not be permitted a rest period of any length, because of possible loss of gas.

Although for purposes of illustration, I have described one mixture of rubber for a specific use thereof, it will be obvious that this mixture may be varied both in percentages and constituents depending upon the intended use and application for the final product.

With the rubber composition impregnated with the various elements, including the charcoal, the rubber mass, divided into as thin layers or sheets as possible of proper dimensions are placed in suitable vulcanizing molds and the entire mass is expanded wholly by heat to fill the mold and vulcanize as described.

If desired, an autoclave may be used to which a pressure may be applied to assist in the vulcanization and expansion. In any event, the principle of the invention now resides in the fact that the application of heat will cause the carbon particles to give up their occluded gases which then, on escape from the carbon, form minute cells with thin hard walls.

In carrying out this stage of the process, it is extremely important that the vulcanization and expansion take place at a relatively slow rate, the latter precede, however, by sufficient vulcanization to prevent escape of the gas driven off from the charcoal. In order to insure such sufficient early vulcanization, it may be desirable to add an accelerator which assists the first stages of curing. Such an accelerator, which may be added with the sulphur, is di-phenol-guanidine.

As has already been explained hereinbefore, due to the deleterious action of any air that may be present, and also due to the necessarily slow process at which this stage has to be carried out, any air which is present would have a great opportunity to attack and oxidize the still unvulcanized rubber, and accordingly, it is necessary that all of the air, or substantially all of the air, should previously have been forced out of the rubber and out of the charcoal. Such exclusion of air will not only safeguard against destruction of the rubber, but will also permit of a greater mixture of nitrogen with the charcoal.

In using a gassing chamber for carrying out this step of the process, I have discovered that under certain circumstances, while the gas expansion is going on as a result of the application of heat, it may be preferable to apply a negative pressure which will assist in drawing out the gases from the minute charcoal particles. Although the amount of charcoal to be added is obviously dependent on the type of product desired, I have discovered that usually this variation ranges from five to ten percent of the entire mass.

In order to control the rate of expansion and vulcanization, it may also be desirable to apply a pressure in an autoclave during this stage of vulcanization, and subsequently as shall be described hereinafter.

The objection to processes that have previously been described is the high cost of a high pressure gassing chamber, especially as the cost rises rapidly as the lateral diameter of the autoclave is increased. In fact, such is the process of manufacturing an autoclave out of a huge block of steel that practical limits are soon reached, beyond which it is impossible to go. These limits in the size of a gassing chamber in the lateral diameter, and to a lesser extent in the length of the autoclave, cause limits as to the size of a mass that is to be treated within it, and the cost rises rapidly with every additional five hundred pounds of pressure that is to be used.

A very special quality of steel-making walls, 6" to 9" in thickness must be used if gassing pressures of three or four thousand pounds to a square inch are to be developed. My process with gassing of carbon with charcoal before admixture to the rubber dough makes such high pressures unnecessary. I utilize only a relatively low pressure in an autoclave to replace some of the gas that may have dislodged from a charcoal during a manipulation and to prevent the untimely or too rapid exit of the gas from the charcoal, and too sudden expansion of the rubber dough during a partial vulcanization process.

In any event it will now be obvious that the entire process is no longer dependent on the unwieldy, high pressures which were required heretofore and which necessitated a two stage process in which extremely high pressures were used in a relatively small sized autoclave and which therefore necessitated restricting the expansion and vulcanization to a partial completion to be followed subsequently by a more complete vulcanization and expansion in a larger chamber in which the high pressures were no longer needed.

The final product is an expanded hard rubber of cellular structure, each cell being in effect a minute bubble of hard rubber in contact with the next adjacent cell, and each cell being filled with a gas. When this rubber is cut, a very disagreeable odor is emitted, which is caused by the hydrogen sulphide freed from the rubber.

This objectionable odor prevents its use for many purposes, such as in containers of foodstuffs, or in fact, for any indoor use. This condition is particularly accentuated in the present product due to the fact that as the expanded rubber is cooled, the gases within these small molecules contract in volume and there is accordingly a tendency for any other gases which have been formed, such as the sulphurous gas produced as a result of the vulcanization, to flow into these cells. The rubber may then be conceived as a gas bag consisting of a multiplicity of minute cells or balloons each filled with nitrogen and hydrogen sulphide.

When any of these cells are punctured as by cutting the composition, this hydrogen sulphide escapes and produces the disagreeable odor.

I have discovered that by placing the complete rubber product in a chamber which is subsequently evacuated to a negative pressure of approximately .001 mm., that I can extract a substantial portion of the hydrogen sulphide and thus eliminate the odors.

In one form I maintain the member in a vacuum for approximately ten minutes and then expose it to atmospheric pressure, and thereafter again to a negative pressure for ten minutes.

In another form I place the rubber in an oven which is then heated to a temperature of 120° F. and maintained at this temperature and negative pressure for approximately ten minutes. Sulphur dioxide is then introduced into the chamber at approximately atmospheric pressure and this condition is maintained for another ten minutes which is then followed again by a vacuum for approximately ten minutes.

In a further process the rubber is subjected to a negative pressure for approximately ten minutes and then filled with chlorine gas at normal pressure and the chamber is again evacuated for another ten minutes.

I discovered from these tests that the rubber in the first process still retained some disagreeable odor; that there is much less in the rubber subjected to the second process; that still better results were obtained where the sulphur dioxide was admitted to take the place of the hydrogen sulphide; and that the best results were obtained where chlorine was used for this purpose. In the latter case not only was the disagreeable odor removed, but a rather faint and pleasant odor obtained.

Both the sulphur dioxide and chlorine were used because of their reaction with hydrogen sulphide. In practice it is my intention to treat or cure the gassed rubber over a long period of time, employing excessive pressures and re-exposures to chlorine. It will be understood, however, by those skilled in the art, that the gases such as sulphur dioxide and chlorine may be replaced by many other gases which will have similar reactions or that, in fact, I may use combinations of such gases, such as using both sulphur dioxide and chlorine in successive stages of evacuation. By means of these longer and repeated terms I can completely remove all the hydrogen sulphide from the material.

It will be understood that this process for removing hydrogen sulphide does not only apply to the expanded rubber made in the preferred manner described hereinbefore by the use of occluded charcoal but may apply to expanded rubber made in any form or, for that matter, in any vulcanized rubber product which contains hydrogen sulphide.

In the above I have described the action of the ammonia in the nitrogen for the specific purpose of eliminating the hydrogen sulphide through a combination of ammonia with the sulphur for which it has a greater affinity than has hydrogen, and the consequent formation of ammonium sulphide. This combination of ammonium sulphide has other advantages. Heretofore, the addition to rubber of an inorganic salt such as ammonium sulphide has been proposed for fire-proofing expanded rubber material. If such a process is carried out and twenty to thirty per cent of ammonium sulphide is added to the rubber dough, it is obvious that the weight is considerably increased. Moreover, the cost of the board is raised about fifty per cent.

In accordance with my process, no material having any substantial weight is added in eliminating the hydrogen sulphide, and the sulphur in the rubber dough is utilized to form the ammonium sulphide, adding to the fire-proofing quality thereof.

In an alternative process, I may avoid the disagreeable odors by imprisioning them in the rubber.

This I propose to do by spraying molten metal on the finished expanded rubber. Various metals may be used such as aluminum, zinc, cadmium, stainless steel, etc., and each seems to have a special use. It is necessary to prepare the surface of the material in order to make the adherence satisfactory. This is done either with a steel or sand-blasting. After the preparation has been completed, molten metal is sprayed with any apparatus well-known in the industry. The entire surface is effectually sealed, so that it is impossible for any odor to escape, and the surface, furthermore, is sufficiently strengthened by the metal so that the likelihood of cuts and a re-opening of these gas cells becomes greatly lessened.

One of the most troublesome problems in this particular development is in the covering of buoys made of my rubber. I can use a molten metal spray, preferably cadmium or stainless steel, which is, of course, the best for salt water, giving without great increase in weight, extreme durability, so that blows would not dent the material.

I find, on experimenting, that some of the smell is not kept in by merely blowing on metal spray. This may be explained by the fact that under a microscope the particles, while seemingly making a solid mass, are shown as actually somewhat apart, leaving minute microscopic holes through which a gas may come. To obviate this difficulty, I apply to the board a thin canvas or muslin, and perhaps, even better, a thin layer of asbestos. When this has been thoroughly glued to the board, I then apply a layer of paint and secure even better adherence of the then applied molten metal to the underlying surface and add to the strengthening qualities, and, most important of all, further seal in the odor.

Although in the above I have described a process for manufacturing an expanded rubber and a novel resultant product which is substantially odorless, it will be understood that the detailed description has been given by way of illustration only. Thus the two stage expanding process described above may be applied to any composition into which a gas may be injected at a high pressure, and which substance is able to retain the gas. It will be clear therefore that I may apply my invention of the two stage process to any synthetic rubber composition and that such synthetic products as resins may be expanded and constructed in accordance with the process described above.

Moreover in the elimination of the disagreeable odors emitted, I may substitute for the ammonia gas, any other product which has a higher affinity for the sulphur than has hydrogen, it being necessary, however, that such products shall not materially add to the cost or weight of the final expanded composition.

Accordingly, I claim:—

1. As an article of manufacture, a gas-expanded rubber product having an individual cellular structure, said rubber product containing quantities of hydrogen sulphide gas, a layer of fibrous material secured to the rubber surface, and a metallic layer surrounding said rubber product and adhering to said fibrous material.

2. As an article of manufacture, a gas-expanded rubber product having an individual cellular structure, said rubber product containing quantities of hydrogen sulphide gas, a layer of asbestos glued to the rubber surface, and a metallic layer surrounding said rubber product and adhering to said asbestos.

3. A buoy comprising closed cell gas expanded rubber having an individual cellular structure, said cellular rubber containing hydrogen sulphide gas, a layer of fibrous material secured to the surface of the rubber, and a metallic layer surrounding said closed cell gas expanded rubber and said layer of fibrous material.

DUDLEY ROBERTS.